United States Patent
Farré Guiu (10) Patent No.: US 10,264,273 B2
(45) Date of Patent: Apr. 16, 2019

(54) COMPUTED INFORMATION FOR METADATA EXTRACTION APPLIED TO TRANSCODING

(71) Applicant: Disney Enterprises, Inc., Burbank, CA (US)

(72) Inventor: Miquel À. Farré Guiu, Bern (CH)

(73) Assignee: Disney Enterprises, Inc., Burbank, CA (US)

( * ) Notice: Subject to any disclaimer, the term of this patent is extended or adjusted under 35 U.S.C. 154(b) by 697 days.

(21) Appl. No.: 14/529,283

(22) Filed: Oct. 31, 2014

(65) Prior Publication Data

US 2016/0127679 A1 May 5, 2016

(51) Int. Cl.
| | | |
|---|---|---|
| *H04N 7/01* | (2006.01) | |
| *H04N 19/40* | (2014.01) | |
| *H04L 29/06* | (2006.01) | |

(52) U.S. Cl.
CPC ........... *H04N 19/40* (2014.11); *H04L 65/607* (2013.01)

(58) Field of Classification Search
CPC .............................. H04N 19/40; H04N 19/37
See application file for complete search history.

(56) References Cited

U.S. PATENT DOCUMENTS 6,490,320 B1 * 12/2002 Vetro ...................... H04L 29/06
375/240.08
2006/0251339 A1 * 11/2006 Gokturk ............ G06F 17/30253
382/305

OTHER PUBLICATIONS

"Metadata-Driven Multimedia Access" —Peter Van Beek, John R. Smith, Touradj Ebrahimi, Teruhiko Suzuki, and Joel Askelof, IEEE Signal Processing Magazine, Mar. 2003.*
"MPEG-7 metadata for video transcoding: motion and difficulty hints", Peter M. Kuhn, Teruhiko Suzuki; Proc. SPIE 4315, Storage and Retrieval for Media Databases 2001, (Jan. 1, 2001); doi: 10.1117/12.410945.*
"Metadata-Driven Multimedia Access" —Peter Van Beek, John R. Smith, Touradj Ebrahimi, Teruhiko Suzuki, and Joel Askelof, IEEE Signal Processing Magazine, Mar. 2003 (Year: 2003).*
"MPEG-7 metadata for video transcoding: motion and difficulty hints", Peter M. Kuhn, Teruhiko Suzuki; Proc. SPIE 4315, Storage and Retrieval for Media Databases 2001, (Jan. 1, 2001); doi: 10.1117/12.410945 (Year: 2001).*

\* cited by examiner

*Primary Examiner* — Gims S Philippe
*Assistant Examiner* — Mainul Hasan
(74) *Attorney, Agent, or Firm* — Patterson + Sheridan, LLP (57) ABSTRACT

Systems, methods and articles of manufacture for transcoding video content. Embodiments include receiving an instance of video content for processing. A plurality of shots within the instance of video content is determined. Embodiments analyze the instance of video content to generate metadata describing the media content. The generated metadata includes, for each of the plurality of shots, data describing a plurality of frames within the respective shot. An optimized transcoding schedule for transcoding the instance of video content from a first video encoding format to a second video encoding format is generated based on the generated metadata. Embodiments further include transcoding the instance of video content according to the optimized transcoding schedule.

20 Claims, 5 Drawing Sheets

COMPUTED INFORMATION FOR METADATA EXTRACTION APPLIED TO TRANSCODING

BACKGROUND

Field of the Invention

The present disclosure relates to transcoding media content, and more specifically, to techniques for extracting metadata from video content as part of a transcoding operation and using the extracted metadata to optimize the transcoding operation for the video content.

Description of the Related Art

A number of different techniques exist today for delivering video content to users. Generally speaking, existing systems for delivering video content, such as over-the-air broadcasts, cable television service, Internet television service, telephone network television service, satellite television service, satellite radio service, websites, etc., provide a relatively impersonalized, generic experience to all viewers. For example, with respect to broadcast television, all viewers of a given television network station receive essentially the same content in essentially the same order.

As the number of delivery mechanisms for delivering video content to users continues to grow, so does the need to encode the video content in various different formats and bit rates. For example, the encoding format for the video content used in broadcast television may differ from the encoding format used in high-quality media streaming. Moreover, in order to provide an improved media streaming environment, content servers may store the video content in multiple different encoding rates, so that an appropriate encoding rate can be selected for streaming to a particular client device. For instance, the content server could select an encoding with a relatively high encoding rate to transmit to a client device with a relatively high bandwidth network connection, and the content server could select an encoding with a relatively low encoding rate to transmit to another client device with a relatively low bandwidth network connection.

SUMMARY

Embodiments provide a method, system and computer-readable medium for transcoding video content. The method, system and computer-readable medium include receiving an instance of video content for processing. Additionally, the method, system and computer-readable medium include determining a plurality of shots within the instance of video content. The method, system and computer-readable medium also include analyzing the instance of video content to generate metadata describing the media content. The generated metadata includes, for each of the plurality of shots, data describing a plurality of frames within the respective shot. Furthermore, the method, system and computer-readable medium include generating an optimized transcoding schedule for transcoding the instance of video content from a first video encoding format to a second video encoding format, based on the generated metadata. The method, system and computer-readable medium additionally include transcoding the instance of video content according to the optimized transcoding schedule.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Generally, transcoding is the direct conversion of a video encoding from a first encoding format to another encoding format. Transcoding is a very common task in broadcasting infrastructures because the media format used in production is not necessarily the same format as the media format used to store the video content in an archive, while another format could be used to broadcast the video content to the audience, and still another format could be used for streaming the content across a communications network (e.g., the Internet). As such, multiple transcoding operations may be performed for a single instance of video content so that the instance of video content can be maintained in multiple different formats.

Efficient methods for transcoding video content are becoming increasingly important as the need for providing video content in a variety of different formats and encoding rates grows. That is, because each transcoding operation is a relatively expensive operation in terms of processing resources and multiple transcoding operations may need to be performed for a single instance of video content, a substantial number of transcoding operations may need to be performed for a content library containing multiple instances of video content. As such, it is desirable for the transcoding operations to be as efficient as possible and even small improvements in transcoding efficiency can result in a substantial cost savings in terms of both resources and time.

Another factor in addition to transcoding efficiency is the quality of the encoding produced by the transcoding operation. Generally, it is desirable to produce as high quality of an encoding as is possible within a given set of constraints. For instance, a particular encoding may be constrained to a particular file size to ensure that the encoding is suitable for its intended purposes. As an example, an encoding intended for streaming to client devices with a relatively low measure of network bandwidth may be constrained to a relatively small file size. As such, transcoding operations for producing such a video encoding may be optimized to maximize the quality of the video encoding while still preserving the desired file size.

When generating an optimized transcoding schedule for use in transcoding a particular instance of video content, it can be beneficial to consider metadata describing the video content. Generally, such metadata describes aspects of the instance of video content. For example, such metadata could describe measures of motion within frames of the video content at various sample points throughout the video content. Additionally, such metadata could specify areas within frames of the video content that are textual regions (i.e., areas within the frame that contain textual characters).

Such metadata can then be used to optimize the transcoding of the instance of video content. For example, frames with a higher measure of motion could be encoded at a higher encoding rate while frames with a lower measure of motion could be encoded at a lower encoding rate. Moreover, metadata specifying textual areas within particular frames of the video content could be used in allocating encoding bandwidth between frames of the video content. For instance, frames that include textual regions could be encoded at a higher encoding rate to help ensure the text remains legible. Additionally, some encoders may allow different regions within a single frame to be encoded at different encoding rates. In such an embodiment, the textual region within the frame could be encoded at a higher encoding rate while the remaining region of the frame could be encoded at a lower encoding rate, to help ensure the text remains legible when the encoded video content is viewed.

Descriptive metadata for video content is becoming increasingly important, particularly because such metadata can have additional uses outside of transcoding operations. For example, descriptive metadata can be used in provide search functionality across a library of video content. For example, a particular instance of video content having a textual region in a particular location of a substantial number of frames could be determined to be sports content (i.e., where the textual region corresponds to a scoreboard located in the particular location of the frames) and could be flagged as such in the content archive, such that the particular instance of video content is returned for searches corresponding to sports content. Such metadata can also be used for offering new types of services to consumers (e.g., identifying and providing related media content in addition to an instance of video content) and for licensing to third parties for their transcoding operations and other types of operations.

Descriptive metadata can be obtained through a number of different procedures, including manual, semi-automatic and fully automatic procedures. Automatic metadata extraction algorithms are typically complex algorithms which usually contain several intermediate media processing algorithms. As such, these metadata extraction algorithms are usually computational expensive operations to perform.

Accordingly, embodiments provide techniques for extracting and using descriptive metadata as part of a video transcoding operation. Embodiments receive an instance of video content for processing and determine a plurality of shots within the instance of video content. Generally, each shot includes a sequence of frames within the video content and every frame within the video content is included within one of the plurality of shots. Embodiments analyze the instance of video content to generate metadata describing the media content. Such metadata can include, for each of the plurality of shots, data describing a plurality of frames within the respective shot. Embodiments then determine an optimized transcoding schedule for transcoding the instance of video content from a first video encoding format to a second video encoding format, based on the generated metadata. Embodiments then transcode the instance of video content according to the optimized transcoding schedule. Doing so enables the transcoding and metadata extraction tasks to share the same computing infrastructure and further allows intermediate results of the metadata extraction algorithms to be reused in performing the transcoding operations. Moreover, embodiments can reduce preprocessing time of the video codecs used in the transcoding process and enable specific values of the video codecs to be automatically tuned using the extracted metadata, a task which would otherwise require time consuming and tedious manual adjustment.

Figure 1:
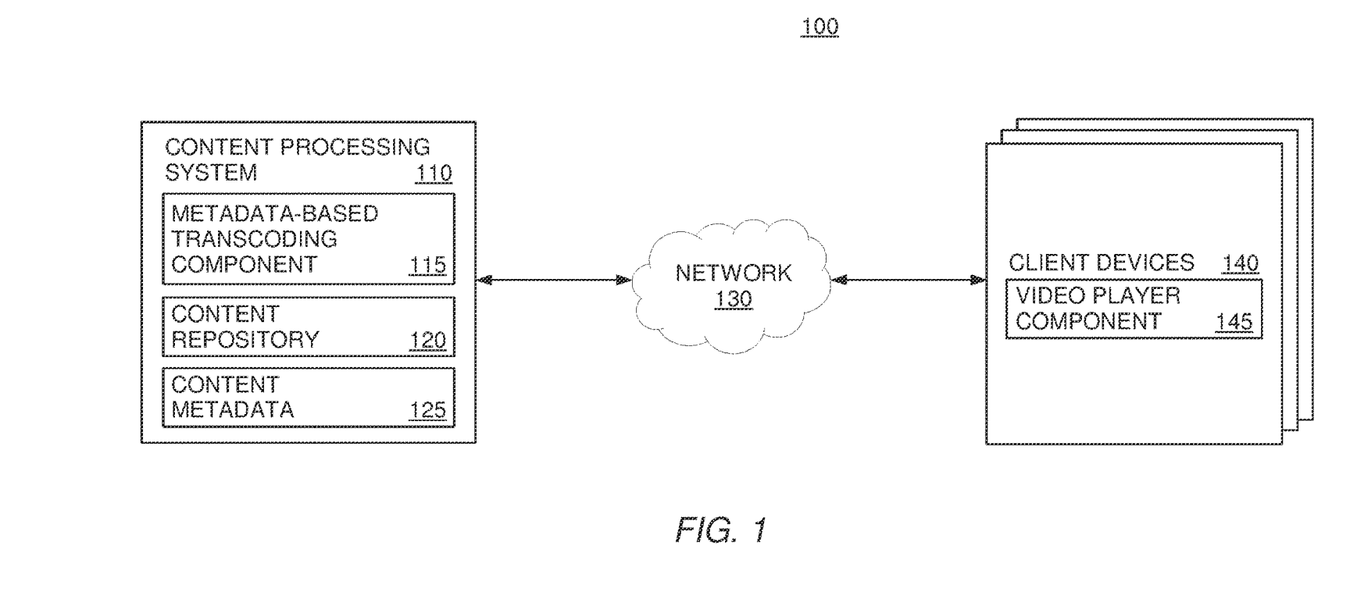
FIG. 1 is a block diagram illustrating a system including a content processing system configured with a metadata-based transcoding component, according to one embodiment described herein.

FIG. 1 is a block diagram illustrating a system including a content processing system configured with a metadata-based transcoding component, according to one embodiment described herein. As shown, the system 100 includes a content processing system 110 and a plurality of client devices 140, interconnected via a network 130. The content processing system 110 includes a metadata-based transcoding component 115, a content repository 120 and content metadata 125. Of note, although the content processing system 110 is shown as a single entity in the system 100, such a depiction is for illustrative purposes only and it is generally contemplated that any number of compute nodes and other resources can be used to implement the content processing system 110.

Generally, the metadata-based transcoding component 115 is configured to perform transcoding operations for content items within the content repository 120. Furthermore, as part of such transcoding operations, the metadata-based transcoding component 115 is configured to extract the content metadata 125 from the content item for use in optimizing the transcoding operation. The metadata-based transcoding component 115 can also save such content metadata 125 for subsequent use with other, non-transcoding operations.

As part of such a transcoding operation, the metadata-based transcoding component 115 can receive an instance of video content for processing. For instance, the metadata-based transcoding component 115 could select one of the content items within the content repository 120 for processing. The metadata-based transcoding component 115 could then determine a plurality of shots within the instance of video content. Generally, each of the shots represents a sequence of frames within the selected instance of video content. For instance, each shot could be identified based on similarities between the frames in the sequence of frames for the shot. As an example, a sequence of frames for a particular shot could be selected based on the frames in the sequences of frames having a similar distribution of pixel coloration, a similar measure of brightness, and/or a similar measure of motion to one another. More generally, however, any number of different parameters and techniques can be used for determining the plurality of shots within the instance of video content.

The metadata-based transcoding component 115 can further analyze the instance of video content to generate the content metadata 125 describing the media content. Such metadata can include, for each of the plurality of shots, data describing a plurality of frames within the respective shot. For example, the metadata-based transcoding component 115 could analyze the frames within the instance of video content to determine which of the frames includes a textual area and, for each frame containing a textual area, a region within the frame where the textual area is located. As another example, the metadata-based transcoding component 115 could determine a measure of motion within each of the plurality of shots, and such motion information could be specified as part of the content metadata 125.

The metadata-based transcoding component 115 may then generate an optimized transcoding schedule for transcoding the instance of video content from a first video encoding format to a second video encoding format, based on the generated metadata. Generally, the transcoding schedule describes an optimized transcoding operation for the instance of video content. Such a schedule can include, for instance, a group of pictures (GOP) size, particular frames to use as reference frames within a GOP, a GOP pattern for use in transcoding the instance of video content, encoding bitrates for particular frames within the instance of video content, and so on.

The metadata-based transcoding component 115 can then transcode the instance of video content according to the optimized transcoding schedule. Moreover, the extracted metadata can be saved for use with subsequent, non-transcoding operations. By extracting the metadata as part of the transcoding operation, the metadata-based transcoding component 115 can operate more efficiently as certain computations performed as part of the metadata extraction process can be reused for the transcoding operation.

Figure 2:
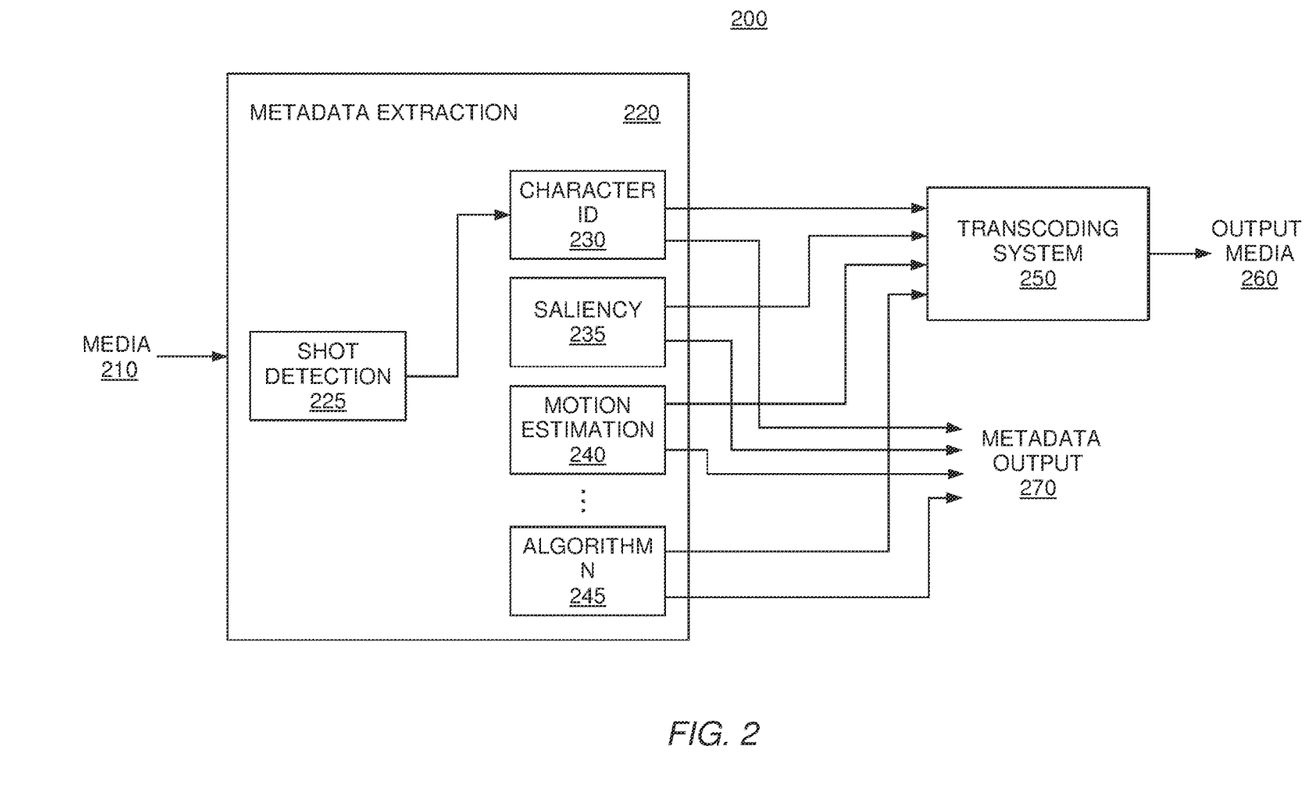
FIG. 2 is a block diagram illustrating a workflow for metadata-based transcoding, according to one embodiment described herein.

FIG. 2 is a block diagram illustrating a workflow for metadata-based transcoding, according to one embodiment described herein. As shown, the diagram 200 depicts an instance of media content 210 that is processed by the metadata-based transcoding component 115 as part of a metadata extraction operation 220. The metadata extraction operation 220 includes a shot detection block 225. Generally, in the shot detection block 225, the metadata-based transcoding component 115 analyzes the frames of the media content 210 to determine a plurality of different shots present within the media content 210. As discussed above, each shot includes a unique sequence of frames within the media content 210 and the various shots can be identified based on similarities between the frames in the respective sequence of frames for the shot.

Once the plurality of shots is identified in the shot detection block 225, the metadata-based transcoding component 115 performs N different metadata extraction algorithms on the plurality of shots within the video content 210. In the diagram 200, such algorithms include a character identification algorithm 230, a saliency determination algorithm 235, a motion estimation algorithm 240, and so on up to an algorithm N 245. Of course, the depiction of the particular algorithms 230, 235, 240 and 245 is provided for illustrative purposes only and without limitation and, more generally, the metadata-based transcoding component 115 can perform any metadata extraction algorithms on the media content 210, consistent with the present disclosure.

Returning to the diagram 200, the results of the algorithms 230, 235, 240 and 245 are sent to both the transcoding system 250 and a metadata output operation 270. As part of the metadata output operation 270, the metadata-based transcoding component 115 saves the extracted metadata for use in subsequent operations. For example, such subsequent operations could include search functionality related to the media content 210 (e.g., descriptive parameters associated with the media content 210 that can be used to identify the media c content 210 as part of a search operation). More generally, any subsequent operations capable of using such metadata can be used.

Additionally, the diagram 200 depicts the extracted metadata being sent to the transcoding system 250, where the media item 210 is transcoded to produce an output media file 260. Here, the metadata-based transcoding component 115 uses the extracted metadata to optimize the transcoding operations for the media item 210. Such transcoding optimizations are also referred to herein as a transcoding schedule for the instance of media content 210. For example, the metadata-based transcoding component 115 could use the computed measures of motion within the frames of the media item 210 to determine an encoding bitrate at which to encode the various frames within the media item 210. For example, the metadata-based transcoding component 115 can select a relatively higher bitrate for a sequence of frames having a higher measure of motion and can select a relatively lower bitrate for another sequence of frames having a lower measure of motion.

As another example, the metadata-based transcoding component 115 could determine a measure of motion compensation within the frames of a particular shot. Generally, motion compensation is an algorithmic technique employed in video data encoding to describe a picture in terms of the transformation of a reference picture to a current picture. Such a shift to a first picture to represent another picture is represented by a motion vector. In determining an optimal transcoding schedule for the media item 210, the metadata-based transcoding component 115 could use the motion compensation information to specify a motion search range for a particular shot within the media item 210. Generally, the motion search range specifies the size of an area the video codec will search for an element of a frame that may have moved from a previous frame (e.g., measured as a number of frames to search). For instance, the metadata-based transcoding component 115 could determine that a shot having a higher measure of motion should have a relatively larger motion search range, and could determine that another shot having a lower measure of motion should have a relatively smaller motion search range.

In one embodiment, the metadata-based transcoding component 115 is configured to reuse totally/partially motion estimation vectors resulting from algorithm 240 for the motion compensation task in the encoder used to perform the transcoding operations on transcoding system 250. In various embodiments, the metadata-based transcoding component 115 may be configured to partially re-use the motion estimation vectors, such that the encoder is still required to compute some additional motion estimation vectors as part of the encoding process. In certain embodiments, however, the encoder can completely re-use the motion estimation vectors computed by the algorithm 240 without having to compute any additional motion estimation vectors. Doing so adds to the efficiency of the encoding process by allowing the encoder to re-use the results of already completed calculations.

Additionally, the metadata-based transcoding component 115 could use the extracted metadata to optimize GOP-related parameters during the transcoding process. Generally, to achieve inter frame compression, some video codecs organized compressed frames into groups. Such groups may contain reference frames (i.e., frames that have all the necessary data to re-create a complete image for the frame) and predicted frames (i.e., frame having less than all of the necessary data to re-create a complete image for the frame, and instead are encoded based on a reference frame).

Generally, the metadata-based transcoding component 115 can define a GOP by a length and a pattern of reference frames and predicted frames. For instance, a longer GOP length and an increased usage of predicted frames can produce a more efficient video encoding, but may be undesirable in certain situations. As an example, the metadata-based transcoding component 115 could determine that a particular shot within the media item 210 contains a high amount of motion and thus could determine that a shorter GOP length and more reference frames should be used to encode the particular shot, thereby producing a higher quality encoding of the shot. As another example, the metadata-based transcoding component 115 could determine that another shot contains relatively little motion and thus a longer GOP length and an increased number of predicted frames can be used in encoding the shot, thereby producing a more efficient encoding.

As still another example, the metadata-based transcoding component 115 could determine that another sequence of frames within the media item 210 contains many shot changes but each of the shots contains a relatively low measure of motion. An example of such a media item could be, for instance, a news broadcast, where the shots switch from one reporter to the next, but the frames within each shot contain relatively little motion. As such, the metadata-based transcoding component 115 could determine that the frames should be encoded with a shorter GOP length due to the high number of scene changes within the frames, but can be encoded with a relatively low bitrate to produce a more efficient encoding due to the low measures of motion within each of the shots.

The metadata-based transcoding component 115 can also be configured to use the saliency metadata in generating the optimized transcoding schedule for the media item 210. For example, the metadata-based transcoding component 115 could perform a region-of-interest based encoding on the media item 210, where different quantization parameters are applied to individual regions within frames (e.g., regions of less interest, regions of more interest, etc.). As part of such a region-of-interest based encoding, the metadata-based transcoding component 115 could use the saliency algorithm 235 to estimate regions of interest within the frames of the media item 210. For example, the metadata-based transcoding component 115 could use the results of the saliency algorithm 235 as a mask to specify salient or regions of interest with frames of the media item 210, prior to encoding the media item 210 using a region-of-interest encoding algorithm. Doing so can produce a higher quality encoding, as the specified regions of high interest can be encoded with a higher quality encoding than the regions of low interest.

In one embodiment, the metadata-based transcoding component 115 is configured to employ a text detection algorithm in generating the metadata describing the media item 210. For instance, the metadata-based transcoding component 115 could detect textual regions within frames of the media item 210 and could then manipulate the textual regions within the frames to improve the readability of the text. Additionally, the metadata-based transcoding component 115 could employ one or more optical character recognition (OCR) algorithms to determine the text appearing within the frames of the video content, and such text could be reflected in the extracted metadata.

Generally, it is desirable to for text within the media item 210 to remain readable in the output media 260. However, certain video encodings (e.g., a low bitrate encoding) may impair the readability of the text within certain frames of the video. Such text illegibility may be acceptable for certain video content, but may be unacceptable for other types of video content (e.g., the text representing the score in a sporting event, weather information within a weather forecast program, etc.). As such, in one embodiment, the metadata-based transcoding component 115 could perform a region-of-interest encoding of the media item 210, where the identified textual regions are specified as regions of interest within the media item. For example, the metadata-based transcoding component 115 could perform the encoding such that the textual region within a frame is encoded at a higher bitrate than a non-textual region within the frame.

In one embodiment, the metadata-based transcoding component 115 is configured to perform a second OCR algorithm for the output media 260 to determine an amount of text within the output media 260. The metadata-based transcoding component 115 could then compare the amount of text within the output media 260 with a determined amount of text within the input media item 210, to determine whether the text of the media item 210 is still readable in the output media 260. That is, if the metadata-based transcoding component 115 determines that the OCR algorithm detected less text in the output media 260 than in the input media item 210, the metadata-based transcoding component 115 could determine that some of the text within the media item 210 was rendered illegible by the encoding operation (e.g., due to blurriness of the text or a size of the text after transcoding).

Upon determining that the output media 260 contains less text than the input media 210, the metadata-based transcoding component 115 could begin an iterative process in which the transcoding schedule for the media item 210 is refined and the media item 210 is again encoded into the output media 260. The metadata-based transcoding component 115 could then perform an additional comparison of the detected text within the output media 260 and the initial media item 210 to determine whether the refined transcoding schedule improved or impaired the readability of the text. The metadata-based transcoding component 115 could continue to iterate through this process of refining the transcoding schedule and encoding the media item 210 until an acceptable level of text readability is achieved (e.g., the output media 260 contains at least a threshold percentage of the text included in the input media 210).

Figure 3:
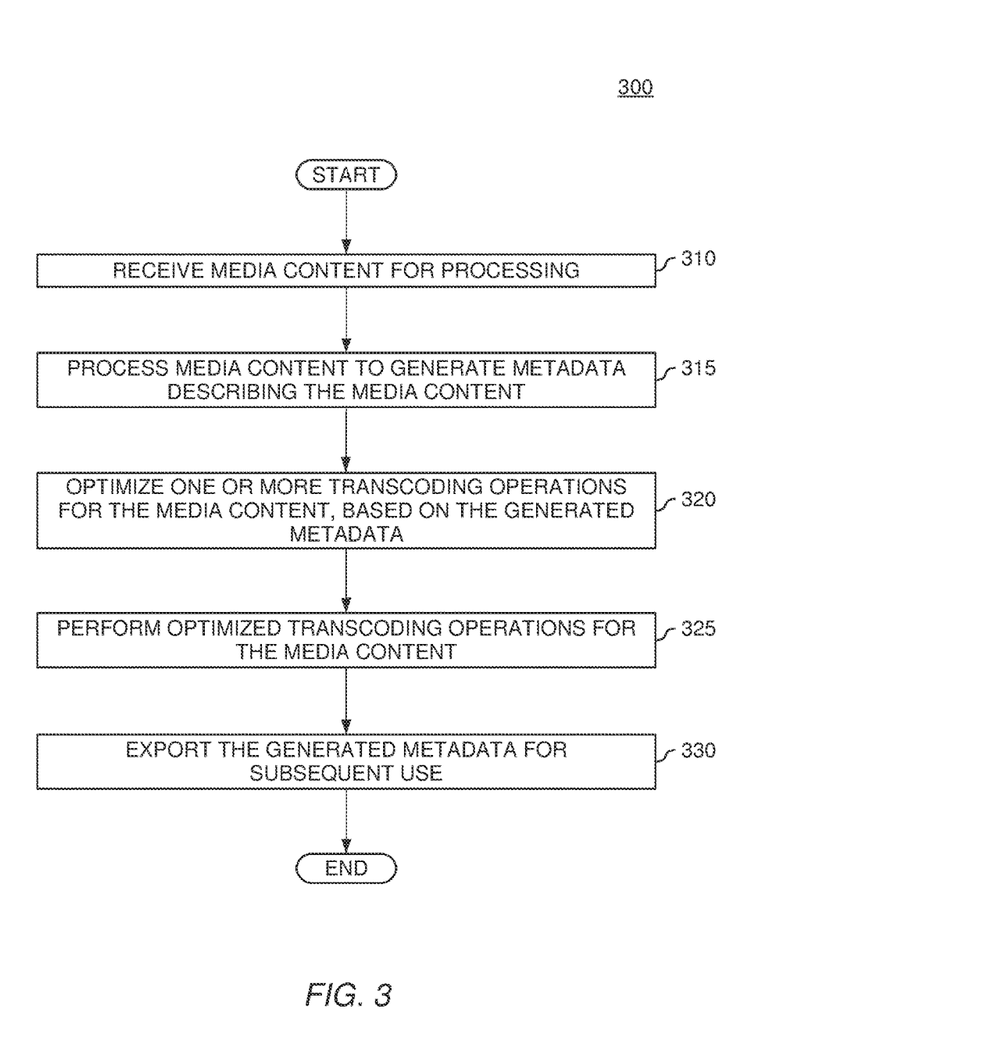
FIG. 3 is a flow diagram illustrating a method for performing metadata-based transcoding for an instance of video content, according to one embodiment described herein.

FIG. 3 is a flow diagram illustrating a method for performing metadata-based transcoding for an instance of video content, according to one embodiment described herein. As shown, the method 300 begins at block 300, where the metadata-based transcoding component 115 receives an instance of media content for processing. The metadata-based transcoding component 115 then processes the instance of media content to generate metadata describing the media content (block 315). As discussed above, such processing can include motion estimation algorithms, saliency determination algorithms, text detection algorithms, and so on.

The metadata-based transcoding component 115 then generates an optimized transcoding schedule for the instance of media content based on the generated metadata (block 320). For example, the transcoding schedule could specify bit rates at which particular shots of the media content are to be encoded, GOP length and/or pattern for encoding shots of the media content, particular regions-of-interest within the video content to be encoded at a relatively higher bitrate, and so on. More generally, the transcoding schedule can include any video encoding optimizations capable of being made based on metadata descriptive of the video content being encoded.

The metadata-based transcoding component 115 then performs an encoding operation for the instance of media content according to the optimized transcoding schedule (block 325). Additionally, the metadata-based transcoding component 115 in the depicted method 300 exports the extracted metadata for subsequent usage (block 330) and the method 300 ends. Advantageously, by extracting the metadata as part of a transcoding operation, the metadata-based transcoding component 115 is able to share particular calculations made during the metadata extraction process with the encoding process, thereby avoiding performing duplicate operations in each of these processes.

Figure 4:
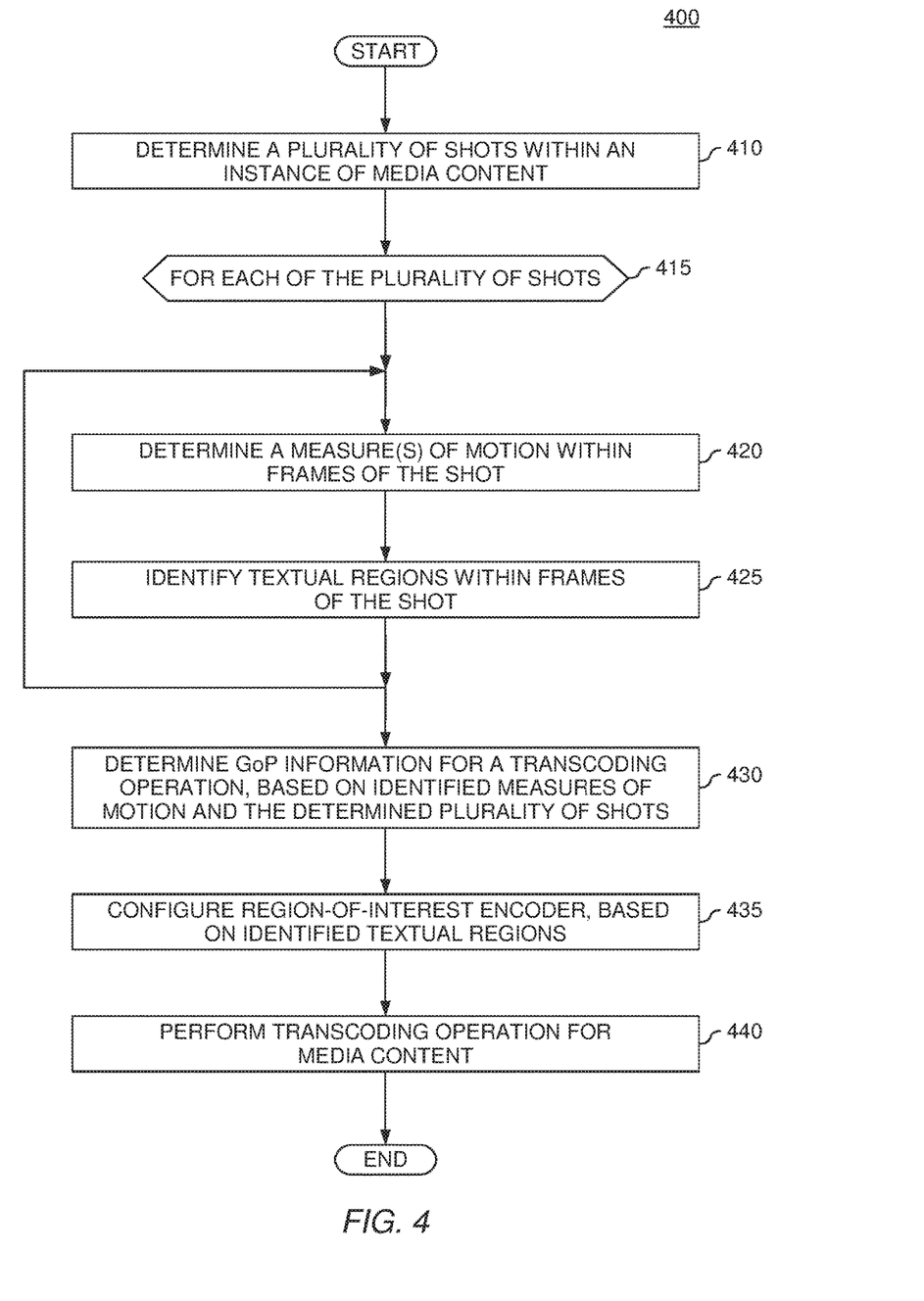
FIG. 4 is a flow diagram illustrating a method for performing metadata-based transcoding for an instance of video content containing textual regions, according to one embodiment described herein.

FIG. 4 is a flow diagram illustrating a method for performing metadata-based transcoding for an instance of video content containing textual regions, according to one embodiment described herein. As shown, the method 400 begins at block 410, where the metadata-based transcoding component 115 determines a plurality of shots within an instance of video content. The method 400 then enters a loop at block 415, where for each of the plurality of shots, the metadata-based transcoding component 115 determines a measure of motion within frames of the shot (block 420). Generally, any technique capable of estimating motion within frames of a video can be used.

Additionally, the metadata-based transcoding component 115 identifies textual regions within frames of the shot (block 425). For example, the metadata-based transcoding component 115 could use an OCR algorithm to identify any textual regions within the frames. Additionally, as discussed above, the metadata-based transcoding component 115 could perform one or more saliency algorithms to estimate regions-of-interest within frames of the video content. The depicted blocked 420 and 425 are repeated for each of the determined shots of the video content.

The metadata-based transcoding component 115 then determines GOP information for a transcoding schedule for use in encoding the video content, based on the identified shots and measures of motion within the shots (block 430). For instance, the GOP information could include GOP length information as well as GOP pattern information. Generally, the metadata-based transcoding component 115 can be configured to encode sequences of frames having a higher measure of motion using a shorter GOP length and/or a GOP pattern with more reference frames, and to encode sequences of frames having a lower measure of motion using a longer GOP length and/or a GOP pattern with fewer reference frames. Moreover, in areas of the video content that change frequently from one shot to the next, the metadata-based transcoding component 115 could use a shorter GOP length. Of course, such examples are provided for illustrative purposes and without limitation, and more generally, any GOP-related configuration parameter can be used in optimizing the transcoding of the video item.

Additionally, the metadata-based transcoding component 115 generates a transcoding schedule for the video item that includes configuration information for a region-of-interest encoder, based on the identified textual regions within the video item (block 435). For instance, the metadata-based transcoding component 115 could configure the region-of-interest encoder such that the textual regions within each of the frames are encoded at a higher level of quality than the remaining non-textual regions within the frames. Moreover, the metadata-based transcoding component 115 could further configure the region-of-interest encoder based on the determined salient regions within the frames of the video content, as detected using the saliency algorithm, such that more salient areas within the frames are encoded at a higher level of quality than the less salient regions.

The metadata-based transcoding component 115 then encodes the video content using the generated transcoding schedule (block 440) and the method 400 ends. By considering shots within the video content, textual areas within the video content as well as measures of motion across frames of the video content, the metadata-based transcoding component 115 can better optimize the encoding of the video content, thereby producing a higher quality video encoding in a more efficient manner. Moreover, by extracting the metadata describing the video content as part of the transcoding operation, the metadata-based transcoding component 115 can take advantage of computations made as part of the metadata extraction, thereby avoiding performing the duplicate operations seen in standalone metadata extraction and encoding operations.

Figure 5:
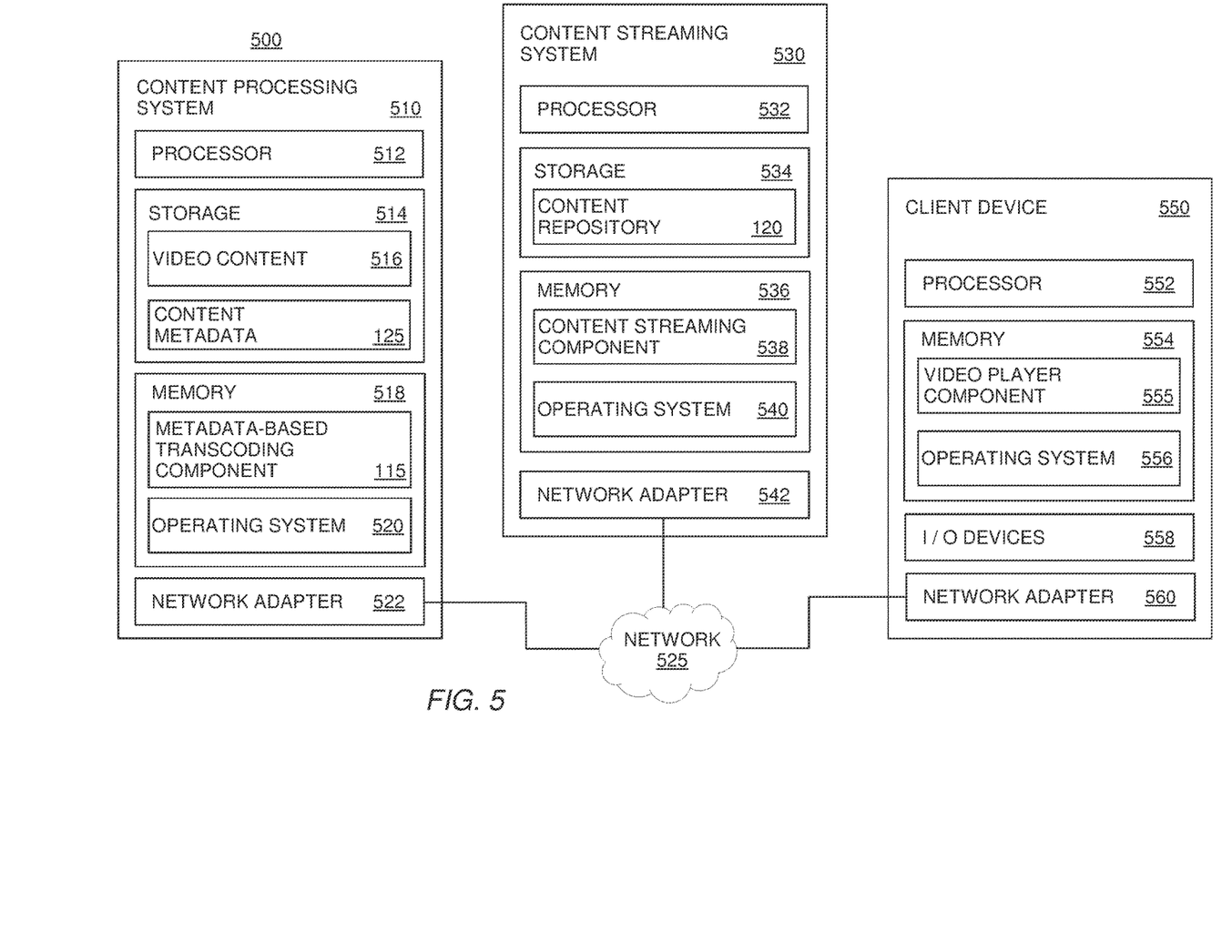
FIG. 5 is a block diagram illustrating a system for transcoding video content and delivering the video content to end-user client devices, according to one embodiment described herein.

FIG. 5 is a block diagram illustrating a system for transcoding video content and delivering the video content to end-user client devices, according to one embodiment described herein. As shown, the system 500 includes a content processing system 510, a content streaming system 530 and a client device 550, interconnected via a network 525. Generally, the network 525 represents any data communication network capable of connecting the systems 510, 530 and 550. For example, the network 525 could be a TCP/IP network, e.g., the Internet.

The content processing system 510 includes a processor 512, storage 514, memory 518, and a network adapter 522. Generally, the processor 510 retrieves and executes programming instructions stored in the memory 518. Processor 512 is included to be representative of a single CPU, multiple CPUs, a single CPU having multiple processing cores, GPUs having multiple execution paths, and the like. The memory 518 is generally included to be representative of a random access memory. Further, while the depicted embodiment illustrates the components of a particular content processing system 510, one of ordinary skill in the art will recognize that interactive objects may use a variety of different hardware architectures. Moreover, it is explicitly contemplated that embodiments may be implemented using any device or computer system capable of performing the functions described herein.

The memory 518 represents any memory sufficiently large to hold the necessary programs and data structures. Memory 518 could be one or a combination of memory devices, including Random Access Memory, nonvolatile or backup memory (e.g., programmable or Flash memories, read-only memories, etc.). In addition, memory 518 and storage 514 may be considered to include memory physically located elsewhere; for example, on another computer communicatively coupled to the system 510. Illustratively, the memory 518 includes a metadata-based transcoding component 115 and an operating system 520. The operating system 520 generally controls the execution of application programs on the system 510. Examples of operating system 520 include UNIX, a version of the Microsoft Windows® operating system, and distributions of the Linux® operating system.

As shown, storage 514 contains video content 516. Generally, as discussed above, the metadata-based transcoding component 115 could analyze the video content 516 to determine a plurality of shots within the instance of video content. The metadata-based transcoding component 115 could also analyze the instance of video content to generate metadata describing the media content, where the generated metadata includes, for each of the plurality of shots, data describing a plurality of frames within the respective shot. Additionally, the metadata-based transcoding component 115 could generate an optimized transcoding schedule for transcoding the instance of video content from a first video encoding format to a second video encoding format, based on the generated metadata. Once the transcoding schedule is generated, the metadata-based transcoding component 115 encodes the instance of video content according to the optimized transcoding schedule.

The content streaming system 530 includes processor 532, storage 534, memory 538 and network adapter 542. Generally, the processor 532 retrieves and executes programming instructions stored in the memory 538. Processor 532 is included to be representative of a single CPU, multiple CPUs, a single CPU having multiple processing cores, GPUs having multiple execution paths, and the like. The memory 538 is generally included to be representative of a random access memory. Further, while the depicted embodiment illustrates the components of a particular content streaming system 530, one of ordinary skill in the art will recognize that interactive objects may use a variety of different hardware architectures. Moreover, it is explicitly contemplated that embodiments may be implemented using any device or computer system capable of performing the functions described herein.

The memory 538 represents any memory sufficiently large to hold the necessary programs and data structures. Memory 538 could be one or a combination of memory devices, including Random Access Memory, nonvolatile or backup memory (e.g., programmable or Flash memories, read-only memories, etc.). In addition, memory 538 and storage 534 may be considered to include memory physically located elsewhere; for example, on another computer communicatively coupled to the system 530. Illustratively, the memory 538 includes a content streaming component 538 and an operating system 540. The operating system 540 generally controls the execution of application programs on the system 530. Examples of operating system 540 include UNIX, a version of the Microsoft Windows® operating system, and distributions of the Linux® operating system.

As shown, storage 534 contains a content repository 120. Generally, the content repository 120 represents the media items managed by the content streaming system 530 and which may be streamed by the content streaming component 538 to, e.g., the client device 550. The client device 550 includes processor 552, memory 554, I/O devices 558 and network adapter 560. Generally, the processor 552 retrieves and executes programming instructions stored in the memory 554. Processor 552 is included to be representative of a single CPU, multiple CPUs, a single CPU having multiple processing cores, GPUs having multiple execution paths, and the like. The memory 554 is generally included to be representative of a random access memory. Further, while the depicted embodiment illustrates the components of a particular client device 550, one of ordinary skill in the art will recognize that interactive objects may use a variety of different hardware architectures. Moreover, it is explicitly contemplated that embodiments may be implemented using any device or computer system capable of performing the functions described herein.

The memory 554 represents any memory sufficiently large to hold the necessary programs and data structures. Memory 554 could be one or a combination of memory devices, including Random Access Memory, nonvolatile or backup memory (e.g., programmable or Flash memories, read-only memories, etc.). In addition, memory 554 may be considered to include memory physically located elsewhere; for example, on another computer communicatively coupled to the client device 550. Illustratively, the memory 554 includes a video player component 555 and an operating system 556. The operating system 556 generally controls the execution of application programs on the client device 550. Examples of operating system 556 include UNIX, a version of the Microsoft Windows® operating system, and distributions of the Linux® operating system. Additional examples of operating system 556 include custom operating systems for gaming consoles, including the custom operating systems for systems such as the Nintendo DS® and Sony PSP®.

Generally, the video player component 145 is configured to playback video content on the client device 550, e.g., for output using a display device of I/O devices 558. Additionally, the video player component 145 could detect a watermark embedded within the video content being played back and could determine a timestamp associated with the watermark (e.g., the timestamp corresponding to the position at which the watermark is embedded within an audio stream of the video content). The video player component 145 could then transmit the timestamp to a content server, such as the content processing system 510. Upon receiving the timestamp information, the video processing component 115 could look-up a known content entity corresponding to the timestamp information and could query the content selection component 125 specifying an identifier for the known content entity to retrieve supplemental content for the content entity. The video processing component 115 could then return the supplemental content to the video player component 145 and the video player component 145 could output at least an indication of the supplemental content. For example, the video player component 145 could display an indication of the supplemental content adjacent to the playback of the video data.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, metadata-based transcoding component 115 could execute on a computing system in the cloud and could process video content to determine a plurality of shots within the video content. The metadata-based transcoding component 115 could then extract metadata describing the video content and each of the plurality of shots and could generate an optimized transcoding schedule based on the extracted metadata. The video content could then be encoded according to the optimized transcoding schedule. Doing so allows client devices to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of video encoding based on measures of motion, the computer-implemented method comprising:
   receiving an instance of video content for processing;
   determining a plurality of shots within the instance of video content, each shot having a respective plurality of frames;
   processing the instance of video using one or more optical character recognition (OCR) algorithms in order to generate first OCR results;
   generating a plurality of measures of motion including, for each of the plurality of shots, a respective measure of motion within the plurality of frames of the respective shot;
   generating, by operation of one or more computer processors, an optimized transcoding schedule for transcoding the instance of video content from a first video encoding format to a second video encoding format, wherein the optimized transcoding schedule specifies, for each of the plurality of shots, a respective motion search range specifying a size of an area in which a video codec is to search for an element that moved from a previous frame of the plurality of frames of the respective shot, wherein the respective motion search range is determined based on the respective measure of motion;
   encoding the instance of video content according to the optimized transcoding schedule, wherein the encoded instance of video content has an associated measure of encoding quality higher than in an absence of the measures of motion, while adhering to a file size restriction at least as stringent as in the absence of the measures of motion, wherein the encoded instance of video content is output;
   processing the encoded instance of video content using the one or more OCR algorithms in order to generate second OCR results; and
   evaluating a level of refinement of the optimized transcoding schedule by comparing the first OCR results and the second OCR results.

2. The computer-implemented method of claim 1, wherein the level of refinement comprises a level of text readability, wherein the computer-implemented method further comprises:
   upon determining that the level of refinement is below a predefined threshold, iteratively refining the optimized transcoding schedule until the level of refinement exceeds the predefined threshold by:
      generating a refined optimized transcoding schedule; and
      encoding the instance of video content according to the refined optimized transcoding schedule;
      processing the encoded instance of video content using the one or more OCR algorithms in order to generate further OCR results; and
      evaluating the level of refinement of the refined optimized transcoding schedule by comparing the first OCR results and the further OCR results.

3. The computer-implemented method of claim 1, wherein generating the optimized transcoding schedule for transcoding the instance of video content further comprises:
   determining group of pictures (GOP) information for use in transcoding the instance of video content, based on the respective measure of motion within the respective plurality of frames for each of the plurality of shots, wherein the GOP information includes a pattern of reference frames and predictive frames to use when transcoding the respective shot in the plurality of shots.

4. The computer-implemented method of claim 1, further comprising:
   determining that two or more frames of the plurality of frames for one of the plurality of shots contain a textual area; and
   determining a plurality of regions including a respective region within each of the two or more frames corresponding to the textual area.

5. The computer-implemented method of claim 1, further comprising generating a plurality of measures of saliency specifying one or more salient regions within each of two or more frames of the instance of video content, wherein generating the optimized transcoding schedule for transcoding the instance of video content further comprises:
   determining a first set of quantization parameters for encoding the one or more salient regions with a higher level of quality; and
   determining a second set of quantization parameters for encoding remaining regions within each of the two or more frames at a lower level of quality, relative to the higher level of quality,
   wherein transcoding the instance of video content according to the optimized transcoding schedule further comprises encoding the two or more frames into the second video encoding format using a region-of-interest encoder, wherein the salient regions of the two or more frames are encoded using the first set of quantization parameters, wherein the remaining regions of the two or more frames encoded using the second set of quantization parameters.

6. A system of video encoding based on measures of motion, the system comprising:
   one or more computer processors; and
   a memory containing a program that, when executed by the one or more computer processors, performs an operation comprising:
      receiving an instance of video content for processing;
      determining a plurality of shots within the instance of video content, each shot having a respective plurality of frames;
      processing the instance of video using one or more optical character recognition (OCR) algorithms in order to generate first OCR results;
      generating a plurality of measures of motion including, for each of the plurality of shots, a respective measure of motion within the plurality of frames of the respective shot;
      generating an optimized transcoding schedule for transcoding the instance of video content from a first video encoding format to a second video encoding format, wherein the optimized transcoding schedule specifies, for each of the plurality of shots, a respective motion search range specifying a size of an area in which a video codec is to search for an element that moved from a previous frame of the plurality of frames of the respective shot, wherein the respective motion search range is determined based on the respective measure of motion;

encoding the instance of video content according to the optimized transcoding schedule, wherein the encoded instance of video content has an associated measure of encoding quality higher than in an absence of the measures of motion, while adhering to a file size restriction at least as stringent as in the absence of the measures of motion, wherein the encoded instance of video content is output;

processing the encoded instance of video content using the one or more OCR algorithms in order to generate second OCR results; and evaluating a level of refinement of the optimized transcoding schedule by comparing the first OCR results and the second OCR results.

7. The system of claim 6, wherein the level of refinement comprises a level of text readability, the operation further comprising:

upon determining that the level of refinement is below a predefined threshold, generating a refined optimized transcoding schedule and encoding the instance of video content according to the refined optimized transcoding schedule.

8. The system of claim 6, wherein generating the optimized transcoding schedule for transcoding the instance of video content further comprises:

determining group of pictures (GOP) information for use in transcoding the instance of video content, based on the respective measure of motion within the respective plurality of frames for each of the plurality of shots, wherein the GOP information includes a pattern of reference frames and predictive frames to use when transcoding the respective shot in the plurality of shots.

9. The system of claim 6, wherein the operation further comprises:

determining that two or more frames of the plurality of frames for one of the plurality of shots contain a textual area; and determining a plurality of regions including a respective region within each of the two or more frames corresponding to the textual area.

10. The system of claim 6, further comprising generating a plurality of measures of saliency specifying one or more salient regions within each of two or more frames of the instance of video content, wherein generating the optimized transcoding schedule for transcoding the instance of video content further comprises:

determining a first set of quantization parameters for encoding the one or more salient regions with a higher level of quality; and determining a second set of quantization parameters for encoding remaining regions within each of the two or more frames at a lower level of quality, relative to the higher level of quality, wherein transcoding the instance of video content according to the optimized transcoding schedule further comprises encoding the two or more frames into the second video encoding format using a region-of-interest encoder, wherein the salient regions of the two or more frames are encoded using the first set of quantization parameters, wherein the remaining regions of the two or more frames encoded using the second set of quantization parameters.

11. A non-transitory computer-readable medium containing a program that, when executed, performs an operation for video encoding based on measures of motion, the operation comprising:

receiving an instance of video content for processing;

determining a plurality of shots within the instance of video content, each shot having a respective plurality of frames;

processing the instance of video using one or more optical character recognition (OCR) algorithms in order to generate first OCR results;

a plurality of measures of motion including, for each of the plurality of shots, a respective measure of motion within the plurality of frames of the respective shot;

generating, by operation of one or more computer processors when executing the program, an optimized transcoding schedule for transcoding the instance of video content from a first video encoding format to a second video encoding format, wherein the optimized transcoding schedule specifies, for each of the plurality of shots, a respective motion search range specifying a size of an area in which a video codec is to search for an element that moved from a previous frame of the plurality of frames of the respective shot, wherein the respective motion search range is determined based on the respective measure of motion;

encoding the instance of video content according to the optimized transcoding schedule, wherein the encoded instance of video content has an associated measure of encoding quality higher than in an absence of the measures of motion, while adhering to a file size restriction at least as stringent as in the absence of the measures of motion, wherein the encoded instance of video content is output;

processing the encoded instance of video content using the one or more OCR algorithms in order to generate second OCR results; and evaluating a level of refinement of the optimized transcoding schedule by comparing the first OCR results and the second OCR results.

12. The non-transitory computer-readable medium of claim 11, wherein generating the optimized transcoding schedule for transcoding the instance of video content further comprises:

determining group of pictures (GOP) information for use in encoding the instance of video content, based on the respective measure of motion within the respective plurality of frames for each of the plurality of shots, wherein the GOP information includes a pattern of reference frames and predictive frames to use when transcoding the respective shot in the plurality of shots; and determining, for each of the plurality of shots, a respective motion search range, based on the respective measure of motion within the respective shot, wherein each motion search range is determined proportional to the measure of motion such that the motion search range is determined to be larger when the measure of motion is higher and such that the motion search range is determined to be smaller when the measure of motion is smaller.

13. The non-transitory computer-readable medium of claim 11, wherein the operation further comprises:

determining that two or more frames of the plurality of frames for one of the plurality of shots contain a textual area; and determining a plurality of regions including a respective region within each of the two or more frames corresponding to the textual area;

wherein generating the optimized transcoding schedule for transcoding the instance of video content further comprises:

determining a first encoding rate for encoding a non-textual region of the two or more frames; and determining a second encoding rate for encoding determined regions of the two or more frames corresponding to the textual area, wherein the second encoding rate is a higher encoding rate than the first encoding rate, wherein transcoding the instance of video content according to the optimized transcoding schedule further comprises encoding the two or more frames into the second video encoding format using a region-of-interest encoder, wherein the non-textual region of the two or more frames is encoded at the first encoding rate, wherein the determined regions of the two or more frames corresponding to the textual area are encoded at the second encoding rate.

14. The non-transitory computer-readable medium of claim 11, wherein the operation further comprises generating a plurality of measures of saliency specifying one or more salient regions within each of two or more frames of the instance of video content, wherein generating the optimized transcoding schedule for transcoding the instance of video content further comprises:

determining a first set of quantization parameters for encoding the one or more salient regions with a higher level of quality; and determining a second set of quantization parameters for encoding remaining regions within each of the two or more frames at a lower level of quality, relative to the higher level of quality, wherein transcoding the instance of video content according to the optimized transcoding schedule further comprises encoding the two or more frames into the second video encoding format using a region-of-interest encoder, wherein the salient regions of the two or more frames are encoded using the first set of quantization parameters, wherein the remaining regions of the two or more frames encoded using the second set of quantization parameters.

15. The computer-implemented method of claim 1, wherein the optimized transcoding schedule is generated by a transcoding application having a plurality of components, the plurality of components including a shot detection component, a character identification component, a motion estimation component, and a saliency determination component;

wherein the plurality of shots within the instance of video content is determined by the shot detection component;

wherein the encoded instance of video content is processed by the character identification component using the one or more OCR algorithms;

wherein the plurality of measures of motion is generated by the motion estimation component by evaluating a plurality of motion estimation vectors of the instance of video content.

16. The computer-implemented method of claim 15, wherein the level of refinement comprises a level of text readability determined by a character identification algorithm, wherein the computer-implemented method further comprises:

upon determining that the level of refinement is below a predefined threshold, iteratively refining the optimized transcoding schedule until the level of refinement exceeds the predefined threshold by:

generating a refined optimized transcoding schedule; and encoding the instance of video content according to the refined optimized transcoding schedule;

processing the encoded instance of video content using the one or more OCR algorithms to generate further OCR results; and evaluating the level of refinement of the refined optimized transcoding schedule by comparing the first OCR results and the further OCR results.

17. The computer-implemented method of claim 16, wherein generating the optimized transcoding schedule for transcoding the instance of video content further comprises:

determining group of pictures (GOP) information for use in transcoding the instance of video content, based on the respective measure of motion within the respective plurality of frames for each of the plurality of shots, wherein the GOP information includes a pattern of reference frames and predictive frames to use when transcoding the respective shot in the plurality of shots;

herein generating the optimized transcoding schedule for transcoding the instance of video content further comprises determining, for each of the plurality of shots, a respective motion search range, based on the respective measure of motion within the respective shot, wherein each motion search range is determined proportional to the measure of motion such that the motion search range is determined to be larger when the measure of motion is higher and such that the motion search range is determined to be smaller when the measure of motion is smaller.

18. The computer-implemented method of claim 17, further comprising:

determining that two or more frames of the plurality of frames for one of the plurality of shots contain a textual area; and determining a plurality of regions including a respective region within each of the two or more frames corresponding to the textual area;

wherein generating the optimized transcoding schedule for transcoding the instance of video content further comprises:

determining a first encoding rate for encoding a non-textual region of the two or more frames; and determining a second encoding rate for encoding determined regions of the two or more frames corresponding to the textual area, wherein the second encoding rate is a higher encoding rate than the first encoding rate.

19. The computer-implemented method of claim 18, wherein transcoding the instance of video content according to the optimized transcoding schedule further comprises encoding the two or more frames into the second video encoding format using a region-of-interest encoder, wherein the non-textual region of the two or more frames is encoded at the first encoding rate, wherein the determined regions of the two or more frames corresponding to the textual area are encoded at the second encoding rate;

wherein the computer-implemented method further comprises generating, by the saliency determination component, a plurality of measures of saliency specifying one or more salient regions within each of two or more frames of the instance of video content.

20. The computer-implemented method of claim 19, wherein generating the optimized transcoding schedule for transcoding the instance of video content further comprises:
- determining a first set of quantization parameters for encoding the one or more salient regions with a higher level of quality; and
- determining a second set of quantization parameters for encoding remaining regions within each of the two or more frames at a lower level of quality, relative to the higher level of quality;
- wherein transcoding the instance of video content according to the optimized transcoding schedule further comprises encoding the two or more frames into the second video encoding format using a region-of-interest encoder, wherein the salient regions of the two or more frames are encoded using the first set of quantization parameters, wherein the remaining regions of the two or more frames encoded using the second set of quantization parameters.

* * * * *

UNITED STATES PATENT AND TRADEMARK OFFICE
CERTIFICATE OF CORRECTION

PATENT NO. : 10,264,273 B2
APPLICATION NO. : 14/529283
DATED : April 16, 2019
INVENTOR(S) : Miquel Farre Guiu Page 1 of 1

It is certified that error appears in the above-identified patent and that said Letters Patent is hereby corrected as shown below:

In the Claims

In Column 18, Line 12, in Claim 11, before "a" insert -- generating --.

Signed and Sealed this
Sixth Day of August, 2019

Andrei Iancu
*Director of the United States Patent and Trademark Office*